United States Patent
Hyatt et al.

(10) Patent No.: US 10,401,471 B2
(45) Date of Patent: Sep. 3, 2019

(54) OBJECT TRACKING METHOD AND SYSTEM

(71) Applicant: FEDEX CORPORATE SERVICES, INC., Memphis, TN (US)

(72) Inventors: Anthony Hyatt, Harrison, AR (US); Stephen Witty, Harrison, AR (US); Kevin Henry, Harrison, AR (US)

(73) Assignee: FEDEX CORPORATE SERVICES, INC., Memphis, TN (US)

( * ) Notice: Subject to any disclaimer, the term of this patent is extended or adjusted under 35 U.S.C. 154(b) by 263 days.

(21) Appl. No.: 15/368,976

(22) Filed: Dec. 5, 2016

(65) Prior Publication Data

US 2017/0082728 A1   Mar. 23, 2017

Related U.S. Application Data

(63) Continuation of application No. 14/174,642, filed on Feb. 6, 2014, now Pat. No. 9,547,079.

(51) Int. Cl.
| | |
|---|---|
| *G01S 5/02* | (2010.01) |
| *G01S 19/13* | (2010.01) |
| *G01S 13/74* | (2006.01) |
| *G06Q 10/08* | (2012.01) |

(Continued)

(52) U.S. Cl.
CPC ............ *G01S 5/0294* (2013.01); *G01S 13/74* (2013.01); *G01S 19/13* (2013.01); *G06Q 10/087* (2013.01); *G06Q 10/0833* (2013.01)

(58) Field of Classification Search
None
See application file for complete search history.

(56) References Cited

U.S. PATENT DOCUMENTS

| | | |
|---|---|---|
| 5,548,637 A | 8/1996 | Heller et al. |
| 6,496,806 B1 | 12/2002 | Horwitz et al. |
| 6,669,089 B2 | 12/2003 | Cybulski et al. |

(Continued)

FOREIGN PATENT DOCUMENTS

| | | | |
|---|---|---|---|
| EP | 2 667 361 A2 | 11/2013 | |
| WO | WO2013/101205 A1 * | 7/2013 | ............ H04W 4/021 |

OTHER PUBLICATIONS

International Search Report and Written Opinion issued in PCT International Application No. PCT/US2015/010261, dated Apr. 9, 2015.

(Continued)

*Primary Examiner* — Bernarr E Gregory

(74) *Attorney, Agent, or Firm* — Finnegan, Henderson, Farabow, Garrett & Dunner, LLP

(57) ABSTRACT

A system for tracking at least one object configured to be transported by at least one vehicle may include at least one computer system. The at least one computer system may be configured to determine at least one location of the at least one vehicle and determine at least one location of the at least one object. The at least one computer system may be further configured to determine at least one location of at least one geofence adjacent the at least one vehicle based on the at least one location of the at least one vehicle. Also, the at least one computer system may be configured to determine whether the at least one object is located within the at least one geofence to determine whether a load of the at least one vehicle includes the at least one object.

20 Claims, 7 Drawing Sheets

(51) Int. Cl.
*G01S 5/00* (2006.01)
*G01S 19/00* (2010.01)

(56) References Cited

U.S. PATENT DOCUMENTS

| | | | |
|---|---|---|---|
| 6,909,356 B2 | 6/2005 | Brown et al. | |
| 6,983,883 B2 | 1/2006 | Ridling | |
| 7,038,573 B2 | 5/2006 | Bann | |
| 7,039,640 B2 | 5/2006 | Miller et al. | |
| 7,121,457 B2 | 10/2006 | Michal, III | |
| 7,236,851 B2 | 6/2007 | Charych | |
| 7,339,469 B2 | 3/2008 | Braun | |
| 7,385,499 B2 * | 6/2008 | Horton | G06Q 10/08 340/426.19 |
| 7,493,211 B2 * | 2/2009 | Breen | G01S 5/0027 340/995.12 |
| 7,504,948 B2 | 3/2009 | Wulff et al. | |
| 7,623,033 B2 | 11/2009 | Ainsworth et al. | |
| 7,746,228 B2 | 6/2010 | Sensenig et al. | |
| 7,845,560 B2 | 12/2010 | Emanuel et al. | |
| 7,868,754 B2 | 1/2011 | Salvat | |
| 7,895,131 B2 | 2/2011 | Kraft | |
| 7,957,833 B2 | 6/2011 | Beucher et al. | |
| 8,196,835 B2 | 6/2012 | Emanuel et al. | |
| 8,210,435 B2 | 7/2012 | Mahan et al. | |
| 8,284,748 B2 * | 10/2012 | Borghei | H04W 4/021 370/338 |
| 8,299,920 B2 | 10/2012 | Hamm et al. | |
| 8,346,468 B2 | 1/2013 | Emanuel et al. | |
| 8,378,815 B1 * | 2/2013 | McNulty | G06Q 10/0833 340/539.13 |
| 8,381,982 B2 | 2/2013 | Kunzig et al. | |
| 8,392,339 B2 | 3/2013 | Kraft | |
| 8,593,276 B2 * | 11/2013 | Doyle | G08B 13/1427 340/539.11 |
| 8,659,420 B2 | 2/2014 | Salvat | |
| 8,756,166 B2 | 6/2014 | Matthews | |
| 8,766,791 B2 | 7/2014 | Koen et al. | |
| 8,766,797 B2 | 7/2014 | Hamm et al. | |
| 9,202,186 B2 | 12/2015 | Wellman et al. | |
| 9,547,079 B2 * | 1/2017 | Hyatt | G01S 13/74 |
| 2005/0052281 A1 | 3/2005 | Bann | |
| 2005/0200457 A1 | 9/2005 | Bridgelall et al. | |
| 2007/0001854 A1 | 1/2007 | Chung et al. | |
| 2007/0198175 A1 | 8/2007 | Williams et al. | |
| 2007/0213869 A1 | 9/2007 | Bandringa et al. | |
| 2007/0239312 A1 | 10/2007 | Andersen et al. | |
| 2007/0282482 A1 | 12/2007 | Beucher et al. | |
| 2008/0004994 A1 | 1/2008 | Ainsworth et al. | |
| 2008/0162034 A1 * | 7/2008 | Breen | H04W 4/022 701/533 |
| 2009/0059004 A1 | 3/2009 | Bochicchio | |
| 2009/0198371 A1 | 8/2009 | Emanuel et al. | |
| 2009/0207024 A1 | 8/2009 | Schatz et al. | |
| 2010/0253508 A1 | 10/2010 | Koen et al. | |
| 2011/0012750 A1 | 1/2011 | Jung | |
| 2011/0095871 A1 | 4/2011 | Kail et al. | |
| 2012/0116931 A1 * | 5/2012 | Meyers | G06Q 10/06 705/28 |
| 2012/0126000 A1 | 5/2012 | Kunzig et al. | |
| 2012/0191272 A1 | 7/2012 | Andersen et al. | |
| 2012/0232961 A1 | 9/2012 | Wellman et al. | |
| 2012/0280865 A1 | 11/2012 | Gardner et al. | |
| 2013/0124430 A1 | 5/2013 | Moir et al. | |

OTHER PUBLICATIONS

European Search Report issued in Application No. 15700930.9 dated Mar. 2, 2018 (9 pages).

* cited by examiner

OBJECT TRACKING METHOD AND SYSTEM

CROSS REFERENCE TO RELATED APPLICATION(S)

This application is a continuation of U.S. application Ser. No. 14/174,642, filed Feb. 6, 2014, now U.S. Pat. No. 9,547,079, the entire content of which is incorporated by reference. The present disclosure relates generally to a tracking method and system, and more particularly, to an object tracking method and system.

FIELD

The present disclosure relates generally to a tracking method and system, and more particularly, to an object tracking method and system.

BACKGROUND

The efficient, safe, and secure shipment of freight, including but not limited to correspondence, materials, goods, components, and commercial products, is an important component in today's business, particularly in view of the international nature of most business enterprises. Freight often is shipped nationally and internationally by means of several different transportation devices, such as trucks, trains, ships, and airplanes. Before the freight reaches its destination, it is often handled by several different entities, such as truck companies, intermediate consolidators, railways, shipping companies, and airlines.

The parcels of freight may be exchanged between entities at different transfer points or hubs. At each hub, the parcels may be separated and transferred by different vehicles to different destinations. The parcels may be unloaded from a vehicle and then loaded onto another vehicle one or more times.

The driver of each vehicle may be provided with one or more documents with identifying information for the parcels to assist in tracking the locations of the parcels in a computer system. For example, when the driver loads or unloads the parcels, the driver may scan the documents so that the computer system may be updated regarding the locations of the parcels and whether the parcels have been loaded or unloaded.

Because the driver enters the identifying information for the parcels each time the parcels are loaded or unloaded, this tracking process may be time consuming and relatively inefficient. Also, there is an increased risk of driver error, for example, if the driver forgets to scan the documents or scans the wrong documents, which may increase the risk of delay in shipping or loss of freight. Also, since the identification information may be provided on the document handled by the driver and not on the parcels themselves, there may be an increased risk of delay in shipping or loss of freight if the driver misplaces the documents.

The disclosed method and system is directed to overcoming one or more of the problems set forth above.

SUMMARY

In accordance with one example, a system for tracking at least one object configured to be transported by at least one vehicle may include at least one computer system. The at least one computer system may be configured to determine at least one location of the at least one vehicle and determine at least one location of the at least one object. The at least one computer system may be further configured to determine at least one location of at least one geofence adjacent the at least one vehicle based on the at least one location of the at least one vehicle. Also, the at least one computer system may be configured to determine whether the at least one object is located within the at least one geofence to determine whether a load of the at least one vehicle includes the at least one object.

In accordance with another example, a method for tracking at least one shipment using at least one computer system may include determining, using the at least one computer system, at least one location of at least one forklift. The method may also include determining, using the at least one computer system, at least one location of the at least one shipment. The method may further include determining, using the at least one computer system, at least one location of at least one geofence in front of the forklift based on the at least one location of the at least one forklift. Also, the method may include determining, using the at least one computer system, whether the at least one shipment is located within the at least one geofence to determine whether a load of the at least one forklift includes the at least one shipment.

In accordance with a further example, a non-transitory computer-readable medium may contain instructions that, when executed by a computer, perform a method for tracking at least one object configured to be transported by at least one vehicle. The method may include determining at least one location of the at least one vehicle, determining at least one location of the at least one object, and determining at least one location of at least one geofence adjacent the at least one vehicle based on the at least one location of the at least one vehicle. The method may also include determining whether a load of the at least one vehicle includes the at least one object based on whether the at least one object is located within the at least one geofence.

It is to be understood that both the foregoing general description and the following detailed description contains examples only and is not restrictive of the invention.

DETAILED DESCRIPTION

Reference will now be made in detail to example embodiments that are illustrated in the accompanying drawings.

Wherever possible, the same reference numbers will be used throughout the drawings to refer to the same or like parts.

Figure 1:
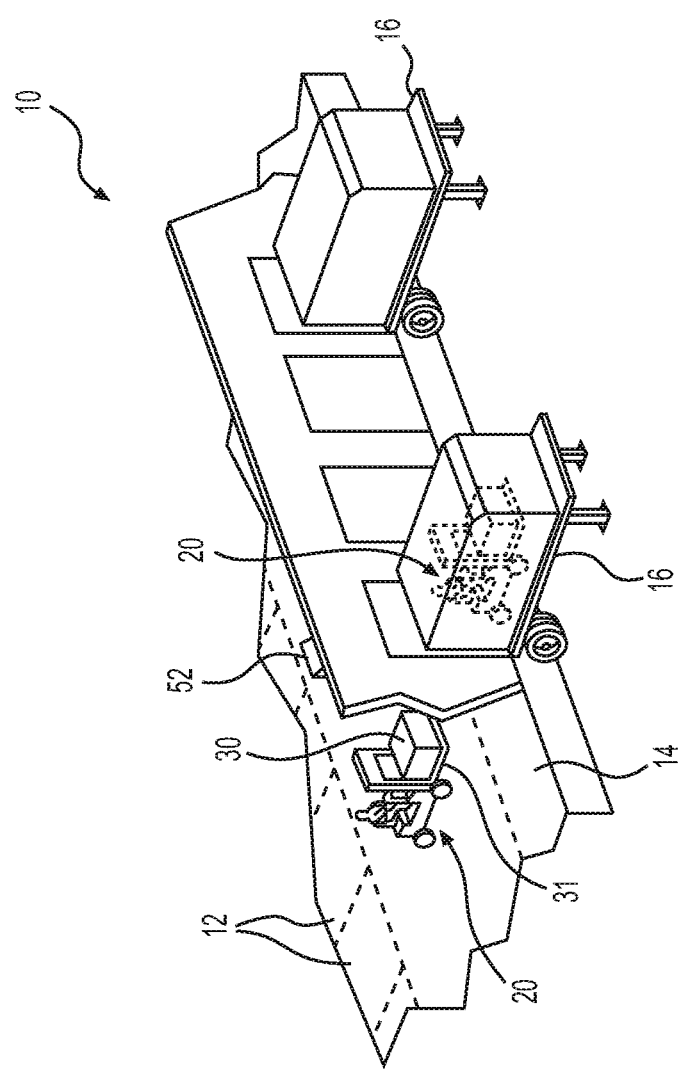
FIG. 1 is a schematic representation of a worksite, according to an embodiment.

FIG. 1 illustrates a worksite 10, according to an embodiment. The worksite 10 may include one or more areas where one or more vehicles, such as forklifts 20, may load or unload one or more objects, such as shipments 30, packages, or other freight. For example, one forklift 20 may be used to pick up one or more shipments 30 at one location at the worksite 10 and transport the shipment(s) 30 to another location at the worksite 10. It is to be understood, however, that vehicles other than forklifts may be used to transport the shipment(s) 30. For example, other manned, semi-autonomous, or autonomous (unmanned) vehicles may be used to transport the shipment(s) 30, such as carts, trailers, motor vehicles, or other vehicles.

The worksite 10 may be at least partially located in a warehouse or other structure or building, as shown in FIG. 1. Alternatively, the worksite 10 may be partially or entirely outdoors. The worksite 10 may include one or more locations or zones where the shipments 30 may be unloaded and stored, either temporarily or for longer periods of time. For example, depending on the layout of the worksite 10, the forklifts 20 may transport the shipments 30 to and from different lanes 12, loading bays, docks 14, or other storage areas, or to and from other vehicles 16 (e.g., trailers, trucks, aircraft, ships, or other delivery vehicles, etc.) at the worksite 10. Although the worksite 10 shown in FIG. 1 includes a warehouse and surrounding area, it is to be understood that the worksite 10 may cover a larger area including multiple buildings.

In an embodiment, the worksite 10 may be a receiving and/or shipping facility, distribution center, or hub where the shipments 30 are received and/or shipped. One or more of the forklifts 20 may transport the shipments 30 within the worksite 10 so that the shipments 30 are loaded into the appropriate delivery vehicles leaving the worksite 10 or loaded into the appropriate storage areas at the worksite 10. Alternatively, it is to be understood that objects other than shipments may be transported and tracked using the systems and methods described below. Other inventory and objects may be tracked, depending on the application.

The shipments 30 may be placed on and supported by a pallet 31, which may be loaded onto and unloaded from the forklifts 20. Alternatively, the forklifts 20 may include or carry another type of platform or surface on which the shipments 30 may be placed.

As described in further detail below, the forklifts 20 may be in communication with a worksite computer system 40 (FIG. 3) associated with, for example, a package or mail delivery company, or other delivery company, or another worksite entity. The worksite computing system 40 may include, for example, a server computer, a desktop computer, a laptop computer, a personal digital assistant (PDA), a hand-held device (e.g., a smartphone), or another suitable computing device known in the art. The worksite computing system 40 may be situated on or near the worksite 10, such as in a worksite headquarters (e.g., an onsite office or trailer), or at a remote location, such as at a corporate headquarters.

Figure 2:
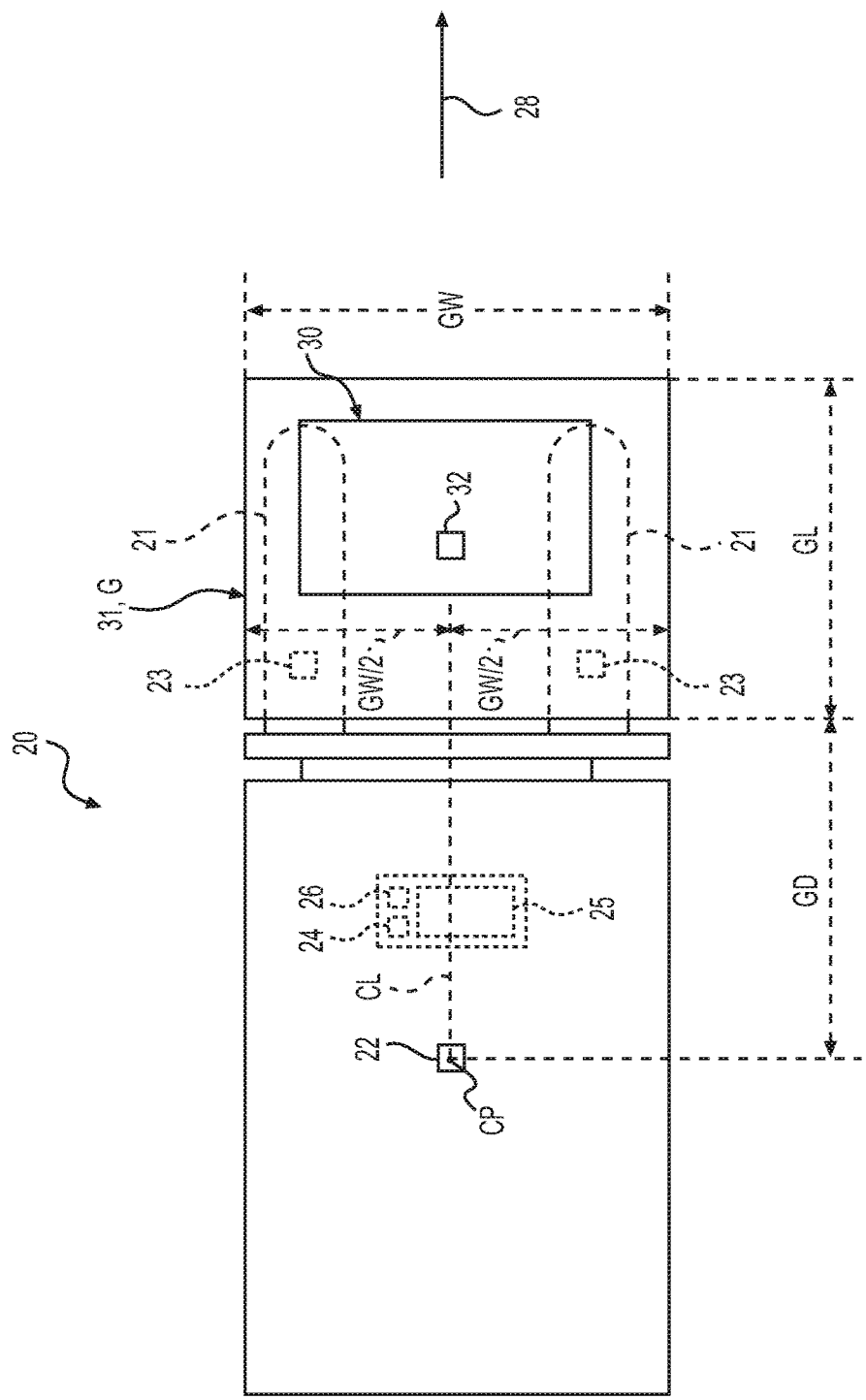
FIG. 2 is a schematic representation of a top view of a forklift carrying a shipment on a pallet, according to an embodiment.

FIG. 2 illustrates the forklift 20 carrying the shipment 30 on the pallet 31, according to an embodiment. The forklift 20 may include forks 21 or another implement at a front end of the forklift 20 that engage the pallet 31 or shipment 30. The forklift 20 may also include a lift mechanism for lifting the forks 21 or other implement, thereby lifting the pallet 31 and/or shipment 30.

Each forklift 20 and shipment 30 may be provided with one or more radio frequency identification (RFID) tags (e.g., forklift tags 22 and/or shipment tags 32) or other wireless devices (e.g., global positioning system (GPS) devices) configured to transfer information. The tags 22, 32 or other devices may be applied using adhesive to the forklift 20 or shipment 30, e.g., using a label that is embedded or printed with the tags 22, 32. Alternatively, the tags 22, 32 or other devices may be applied using other attachment methods. For example, when applying the tags 22 to vehicles, such as the forklifts 20, the tags 22 may be applied using screws, rivets, welds, etc. For the forklift tag 22, the information may include identification information (e.g., a unique identifier or other information identifying the forklift 20). For the shipment tag 42, the information may include identification information (e.g., a unique identifier or other information identifying the shipment 30 and/or the contents within the shipment 30) or other tracking information (e.g., the origin, interim, or destination locations, or other information associated with the shipment 30). The unique identifier for the shipment 30 may include one or more alphanumeric characters and/or symbols assigned to the shipment 30, such as a progressive number (PRO number) for tracking the shipment 30 as known in the art.

Each forklift 20 may include one or more forklift tags 22. The forklift tag(s) 22 may be placed at a central location of the forklift 20, as shown in FIG. 2. Although FIG. 2 shows a single forklift tag 22, each forklift 20 may include a plurality of forklift tags 22, e.g., eight tags 22. Some of the tags 22 may be located closer to the top of the forklift 20 and some of the tags 22 may be located closer to the wheels of the forklift 20. Alternatively, the forklifts 20 may each include fewer than eight tags 22 (e.g., two or four tags) or more than eight tags 22. As described below, the plurality of the forklift tags 22 may be used to identify a center point CP of the forklift 20 for use in identifying the location of the forklift 20.

Each forklift 20 may further include an onboard system configured to allow the operator to monitor various operations of the forklift 20. For example, each forklift 20 may include a control system in communication with a weight determining device 23, a direction determining device 24, an operator display device 25, and a communication device 26.

The weight determining device 23 may be configured to measure a weight of the load carried by the forklift 20, e.g., the load carried by the forks 21. For example, the weight determining device 23 may include one or more weight sensors, and may be provided on the forks 21. When the forks 21 lift the pallet 31 and the shipment 30, the weight determining device 23 may determine the weight of the pallet 31 and the shipment 30.

The direction determining device 24 may be configured to determine an orientation or a direction of travel 28 of the forklift 20. For example, the direction determining device 24 may include a digital compass and may indicate the direction of travel 28 in a frame of reference defined by cardinal directions (e.g., north, south, east, west), intercardinal directions (e.g., northeast, northwest, southeast, southwest), and/or intermediate directions between the cardinal and intercardinal directions.

The operator display device 25 may include one or more monitors (e.g., a liquid crystal display (LCD), a cathode ray tube (CRT), a plasma display, a touch-screen, a portable hand-held device (e.g., a smartphone), a projection display device (e.g., a heads-up display), or any such display device known in the art) configured to actively and responsively display information to the operator of the forklift 20. The operator display device 25 may display images in response to signals provided by the control system of the forklift 20 and information received from the worksite computer system 40, as described below.

The communication device 26 may include any device configured to facilitate communications between the forklift 20 and the worksite computer system 40. For example, the communication device 26 may include an antenna, a transmitter, a receiver, and/or any other devices that enable the forklift 20 to wirelessly exchange information (e.g., signals from the control system, the weight determining device 23, the direction determining device 24 of the forklift 20, etc.) with the worksite computer system 40 via a communication link.

Figure 3:
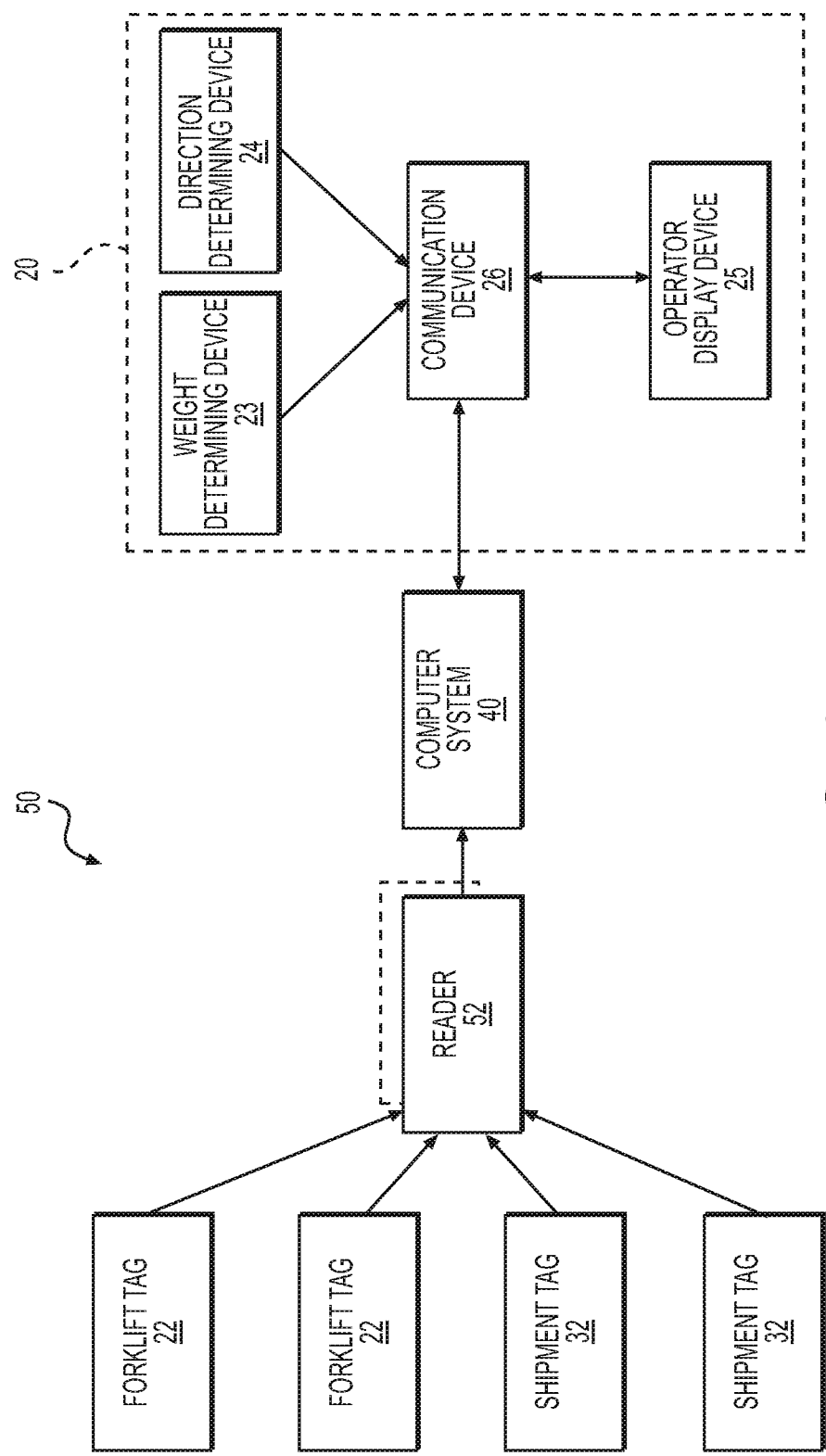
FIG. 3 is a schematic representation of a tracking system, according to an embodiment.

FIG. 3 illustrates a tracking system 50 for tracking the forklifts 20 and the shipments 30 at the worksite 10, according to an embodiment. For example, the tracking system 50 may associate each shipment 30 to the forklift(s) 20 on which the shipment 30 is loaded. The tracking system 50 may automatically associate the shipments 30 with the forklifts 20, e.g., without relying on input from the operators of the forklifts 20.

The tracking system 50 may include the worksite computer system 40 described above. For example, the worksite computer system 40 may include a memory, a processor, and a display for presenting one or more maps and other tracking information associated with the forklifts 20 and the shipments 30 described below.

The processor of the worksite computer system 40 may be configured to receive data as described below and process information stored in the memory. The processor may be configured with different types of hardware and/or software (e.g., a microprocessor, a gateway, a product link device, a communication adapter, etc.). Further, the processor may execute software for performing one or more functions consistent with the disclosed embodiments. The processor may include any appropriate type of general purpose microprocessor, digital signal processor, or microcontroller.

The worksite computer system 40 may include a transceiver device with one or more devices that transmit and receive data, such as data processed by the processor and/or stored by the memory. The memory may be configured to store information used by the processor, e.g., computer programs or code used by the processor to enable the processor to perform functions consistent with disclosed embodiments, e.g., the processes described below. The memory may include one or more memory devices including, but not limited to, a storage medium such as a read-only memory (ROM), a flash memory, a dynamic or static random access memory (RAM), a hard disk device, an optical disk device, etc.

The tracking system 50 may also include one or more readers 52 or interrogators for obtaining information from the forklift and shipment tags 22, 32. For example, the readers 52 and the forklift and shipment tags 22, 32 may be associated with a real-time locating system (RTLS) as known in the art. In the embodiment shown in FIG. 1, one of the readers 52 may be mounted to a wall at the worksite 10. Alternatively or in addition, the reader(s) 52 may be mounted to a ceiling, and/or mounted or placed on a surface at or near the worksite 10. The number and location of the reader(s) 52 may depend on the relative strength of the signals from the forklift and shipment tags 22, 32. In some embodiments (e.g., when the tags 22, 32 supply relatively stronger signals), fewer readers 52 may be provided and may be located on or near the worksite 10, or remotely from the worksite 10. For example, the tags 22, 32 may be configured to emit ultra high frequency (UHF) radio waves. Alternatively (e.g., when the tags 22, 32 supply relatively weaker signals), an array of readers 52 may be provided and may be located on and/or near the worksite 10, e.g., at spaced apart intervals along the ceiling and/or walls of the worksite 10.

The forklift and shipment tags 22, 32 may be RFID tags, which may be active, semi-passive, or passive. Passive tags may be powered entirely by signals from the reader 52. Active and semi-passive tags may include a power source (e.g., a battery) to power its circuits. Semi-passive tags may also rely on the reader 52 to supply its power for certain functions, such as communicating with the reader 52. The readers 52 may use wireless non-contact radio-frequency electromagnetic fields to transfer information for the purpose of automatically identifying and tracking the forklifts 20 and shipments 30 to which the tags 22, 32 are attached. For example, each reader 52 may periodically send signals in an area surrounding the reader 52 and receive responses from the tags 22, 32 that are located within the area surrounding the reader 52.

The worksite computer system 40 may be connected, e.g., via a network, to the communication devices 26 of the forklifts 20 and the readers 52. The network may be any type of wireline or wireless communication network for exchanging or delivering information or signals, such as the internet, a wireless local area network (LAN), or any other network. Thus, the network may be any type of communications system known in the art.

The worksite computer system 40 may store location information for each reader 52 and may determine the locations of the tags 22, 32 based on the responses from the tags 22, 32 (e.g., including identification information for the respective tags 22, 32) and based on which reader(s) 52 received responses from the tags 22, 32. The locations of the tags 22, 32 may be determined and updated periodically (e.g., every 0.5 or 1 second).

For example, when one of the readers 52 receives a response from one of the shipment tags 32, the reader 52 may communicate the identification information for the shipment tag 32 and the identification information for the reader 52 to the worksite computer system 40. Other information may also be communicated to the worksite computer system 40, such as the strength of the response and/or the angle at which the response from the shipment tag 32 is received. Based on the communicated information, the worksite computer system 40 may determine the location of the tag 32. For example, the worksite computer system 40 may determine the location of the reader(s) 52 that received the response(s) from the tag 32, which may then be used with the determined strength and/or angle of the response(s) received from the tag 32 to determine the location of the tag 32.

Alternatively, the locations of the tags 22, 32 may be determined using the readers 52 and communicated from the readers 52 to the worksite computer system 40. As another alternative, GPS devices may be used instead of RFID tags 22, 32 and readers 52, and the GPS devices may be applied to the forklifts 20 and shipments 30 to determine their locations and communicate their locations to the worksite computer system 40.

The worksite computer system 40 may store a map of the worksite 10 that indicates the locations of the forklifts 20 and shipments 30. The locations of each shipment 30 may be indicated by the location of the shipment tag 32 placed on the shipment 30. The locations of each forklift 20 may be indicated by the location of the forklift tag(s) 22 placed on the forklift 20.

As described above and shown in FIG. 2, each forklift 20 may include multiple tags 22. The tags 22 may be used to identify the center point CP of the forklift 20 for use in tracking the location of the forklift 20. For example, for each tag 22 on the forklift 20, the worksite computer system 40 may determine the location of the tag 22 multiple times and may calculate a median for each tag 22 based on the multiple determined locations. The worksite computer system 40 may then determine an average of the medians calculated for the tags 22 on the forklift 20 to determine the location of the center point CP of the forklift 20.

The worksite computer system 40 may create or determine a geofence G located in front of each forklift 20. The geofence G is a virtual perimeter that may represent an approximate size of a pallet loaded onto the forklift 20. The geofence G may have a length GL and width GW. For example, the geofence G may be approximately the size of a standard pallet recognized by the International Organization for Standardization (ISO), Grocery Manufacturers' Association (GMA), European Pallet Association (EPAL), or other standard-setting organization or association. In an embodiment, the geofence G may be approximately 1000 millimeters (mm) wide by approximately 1000 mm long. Alternatively, the geofence G may be approximately 1219 mm wide by approximately 1016 mm long; approximately 1016 mm wide by approximately 1219 mm long; approximately 1000 mm wide by approximately 1200 mm long; approximately 1165 mm wide by approximately 1165 mm long; approximately 1067 mm wide by approximately 1067 mm long; approximately 1100 mm wide by approximately 1100 mm long; or approximately 800 mm wide by approximately 1200 mm long. Alternatively, the geofence G may be larger than the size of a standard pallet or may be another size that is unrelated to the size of a pallet. The worksite computer system 40 may also allow a user to select a size of the geofence G from a variety of sizes, or input the size. Also, the size of the geofence G may change dynamically (e.g., grow or shrink), as described below.

The geofence G may be located a distance GD in front of the center point CP of the forklift 20. The worksite computer system 40 may determine the distance GD based on characteristics of the forklift 20, e.g., the length of the forklift 20, the distance between the center point CP of the forklift 20 and the forks 21 or other features at the front of the forklift 20, etc. In an embodiment, the distance GD may be approximately 1500 mm. Alternatively, the size and location of the geofence G may be determined based on the size and location of other types of loads that may be carried by the forklift 20 as known in the art.

As shown in FIG. 2, the distance GD may be measured along a center line CL of the forklift 20, such as a line extending from the center point CP along the direction of travel 28. The geofence may extend along the center line CL in front of the forklift 20 starting at distance GD and ending at distance (GD+GL). The geofence G may extend along a distance GW/2 (half of the width GW of the geofence G) on each side of the center line CL so that the geofence G extends the total width GW.

The map of the worksite 10 stored on the worksite computer system 40 may indicate the location of the geofences G for the forklifts 20 as well as the locations of the forklifts 20 and shipments 30. The locations of the geofences G may be periodically updated each time the locations of the forklifts 20 are updated (e.g., every 0.5 or 1 second). The map may be communicated to the operator display device 25 via communication device 26 to allow the operator of the forklift 20 to view the locations of the forklift 20 (e.g., the center point CP of the forklift 20), the geofence G for the forklift 20, and the shipments 30 surrounding the forklift 20.

As described above, the worksite computer system 40 may determine the locations of the forklifts 20 (e.g., the center points CP) and create the geofence G. Alternatively, the control systems of the forklifts 20 may determine the locations of the respective forklifts 20 and respective geofences G, and may communicate the information to the worksite computer system 40.

Figure 4:
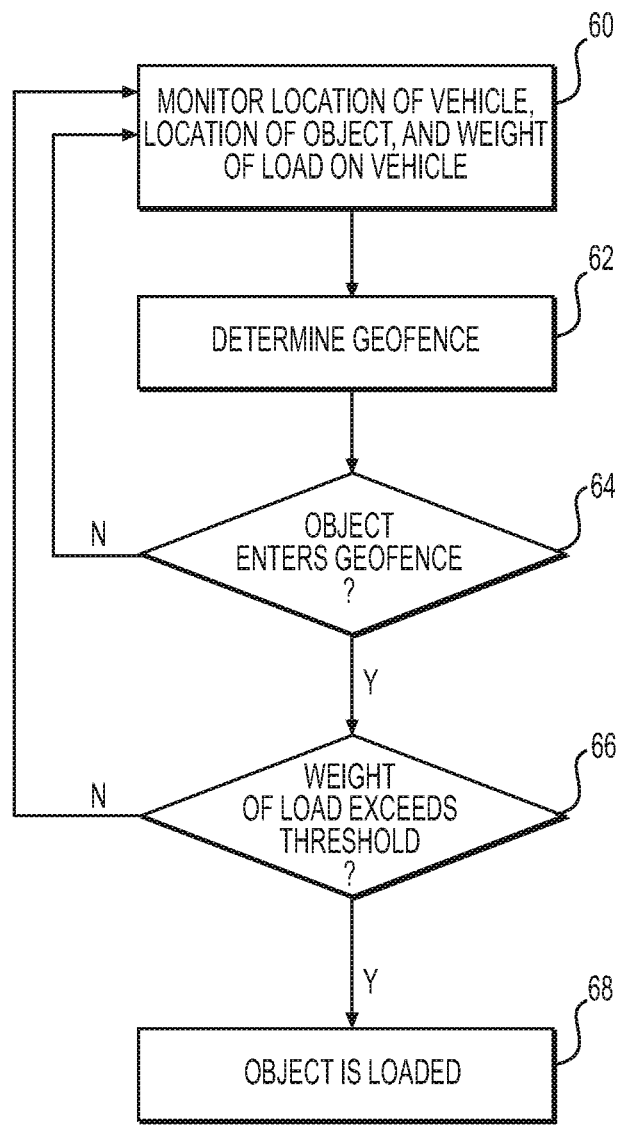
FIG. 4 is a flow chart showing steps for determining whether an object is loaded onto a vehicle, according to an embodiment.

The geofence G may be used by the tracking system 50 to determine whether a shipment 30 is loaded onto or unloaded from the forklift 20. With reference to FIG. 4, the operation of the tracking system 50 will now be described.

The worksite computer system 40 may continuously monitor the locations of the forklifts 20 and the shipments 30 at the worksite 10 and the weight of loads on the forklifts 20 (step 60). As described above, the location of each forklift 20 and shipment 30 may be determined using the forklift and shipment tags 22, 32 and the readers 52. The weight of the load on each forklift 20 may be determined using the weight determining device 23 for the forklift 20.

The worksite computer system 40 may also continuously determine the geofences G for each forklift 20 (step 62). As described above, the location and orientation of the geofences G may be determined based on the location of the center point CP for the respective forklifts 20, the direction of travel 28 of the respective forklifts 20, the characteristics of the respective forklifts 20, etc. The worksite computer system 40 may continuously perform steps 60 and 62 while the steps 64, 66, and 68 are being performed.

The following description in connection with FIG. 4 relates to the detection of the loading and unloading of one shipment 30 from one forklift 20. It is understood, however, that the following steps may be performed simultaneously for multiple shipments 30 and multiple forklifts 20.

The worksite computer system 40 may determine whether the shipment 30 enters or is located within the geofence G of the forklift 20 (step 64). For example, the worksite computer system 40 may determine if the shipment tag 32, the location of which is determined in step 60, enters the geofence G for the forklift 20. If the worksite computer system 40 does not determine that the shipment 30 enters the geofence G (step 64; no), then the worksite computer system 40 may determine that the shipment 30 has not been loaded onto the forklift 20. Then, the worksite computer system 40 may continue to monitor the location of the forklift 20 and the shipment 30, and the weight of load on the forklift 20 (step 60).

If the worksite computer system 40 determines that the shipment 30 enters the geofence G (step 64; yes), then the worksite computer system 40 may determine whether the weight of load on the forklift 20 is greater than a threshold (step 66). The threshold may be variable. For example, the threshold may be defined and adjusted based on input from a user into the worksite computer system 40. For example, the threshold may be approximately 35 pounds, approximately 20 pounds, approximately 50 pounds, etc. Comparing the determined weight to the threshold may be useful for verifying that the shipment 30 has in fact been loaded onto the forklift 20. Certain RTLS systems may experience jitter or error when determining the locations of the tags 22, 32. For example, the forklift 20 may be positioned so that the geofence G is next to an unloaded shipment, e.g., within one foot, and if there is jitter of one foot or more, the worksite computer system 40 may indicate that the shipment 30 has entered the geofence G although it has not actually been loaded onto the forklift 20. By confirming that the weight of the load on the forklift 20 is greater than the threshold, the worksite computer system 40 may determine whether the shipment 30 is actually loaded onto the forklift 20.

If the worksite computer system 40 does not determine that the weight of the load on the forklift 20 is greater than the threshold (step 66; no), then the worksite computer system 40 may determine that the shipment 30 is not actually loaded onto the forklift 20. Then, the worksite computer system 40 may continue to monitor the location of the forklift 20 and the shipment 30, and the weight of the load on the forklift 20 (step 60). If the worksite computer system 40 determines that the weight of the load on the forklift 20 is greater than the threshold (step 66; yes), then the worksite computer system 40 may determine that the shipment 30 is loaded onto the forklift 20 (step 68).

Also, if the worksite computer system 40 determines that there is a load on the forklift 20 that exceeds the threshold, but that no shipment 30 entered the geofence G, the worksite computer system 40 may expand the geofence G, e.g., by an increment (e.g., 5, 10, or 20 mm, or other distance) from the front, rear, and/or sides of the geofence G. After expanding the geofence G, the worksite computer system 40 may determine if a shipment 30 is detected in the geofence G. If no shipment 30 is detected, the geofence G may be expanded repeatedly by increments until a shipment 30 is detected in the geofence G. This may allow the worksite computer system 40 to detect that shipments 30 of non-standard size are loaded onto the forklift 20. For example, relatively wider or longer shipments may be loaded on the forklift 20 in such a way that the shipment tag 32 may be outside the geofence G. By dynamically growing the geofence G as described above, non-standard sized shipments 30 may be determined to be loaded onto the forklift 20. Alternatively, or in addition, the worksite computer system 40 may prompt the forklift operator to check if the shipment 30 is missing a shipment tag 32 or prompt the forklift operator to move closer to the area of coverage of the readers 52.

After the shipment 30 is loaded, the worksite computer system 40 may determine the location where the forklift 20 is delivering the shipment 30 and may communicate the delivery location to the control system of the forklift 20 via the communication device 26. The delivery location may then be displayed on the operator display device 25 for viewing by the forklift operator, for example, using a message box and/or by highlighting the area on a map. The forklift operator may then drive the forklift 20 to the delivery location to unload the shipment 30.

The worksite computer system 40 may continue to monitor the locations of the forklifts 20 and the shipments 30 at the worksite 10, and the weight of loads on the forklifts 20. To detect when the shipment 30 is unloaded from the forklift 20, the worksite computer system 40 may determine when the weight of the load on the forklift 20 drops below the threshold or goes to zero, e.g., using the weight determining device 23.

The worksite computer system 40 may store information about the loading and unloading of shipments 30 from the forklifts 20. The worksite computer system 40 may also communicate the information about the loading and unloading of shipments 30 to the forklifts 20 via the communication devices 26 so that the information may be displayed on the operator display devices 25.

Figure 5:
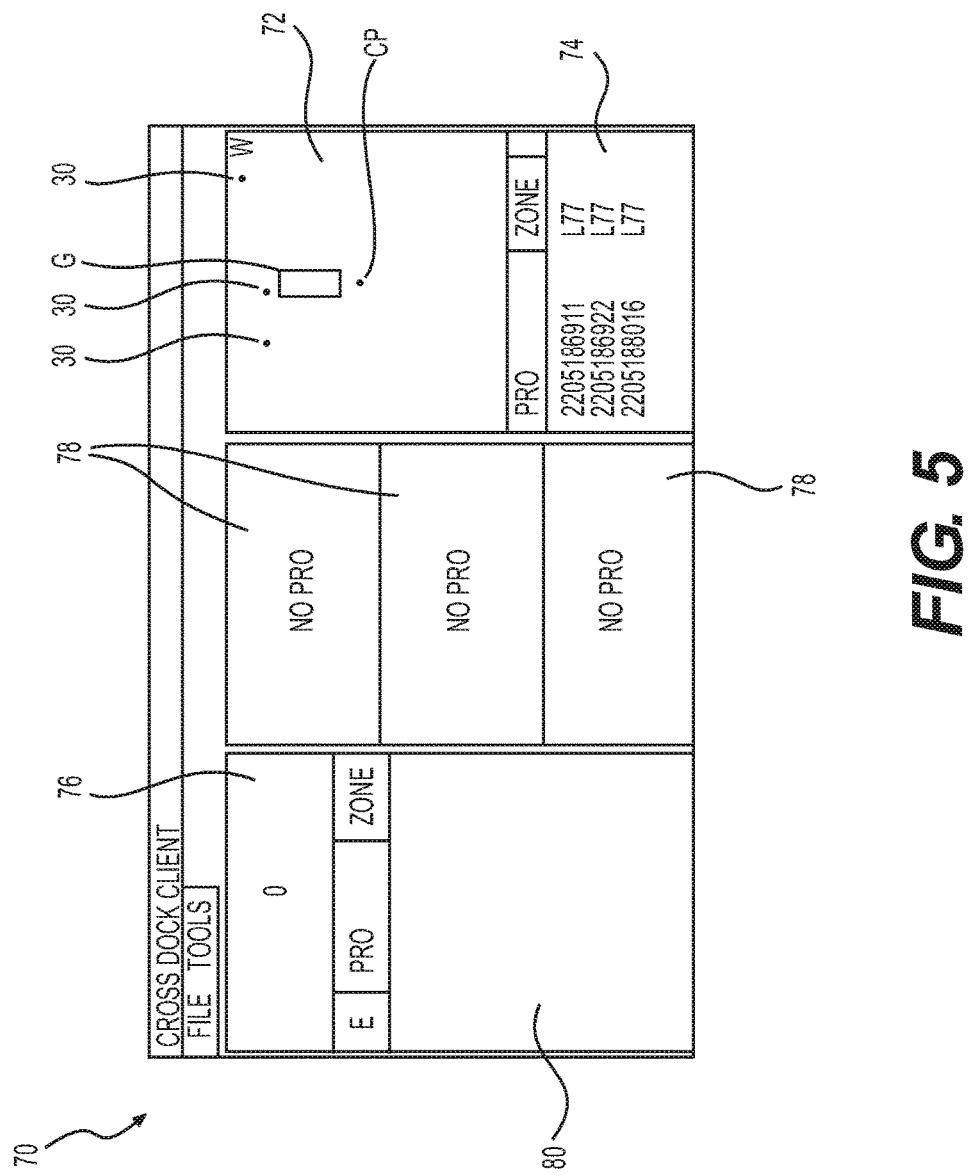
FIG. 5 is an image illustrating a screenshot from a display device prior to determining that an object is loaded onto a vehicle, according to an embodiment.
Figure 6:
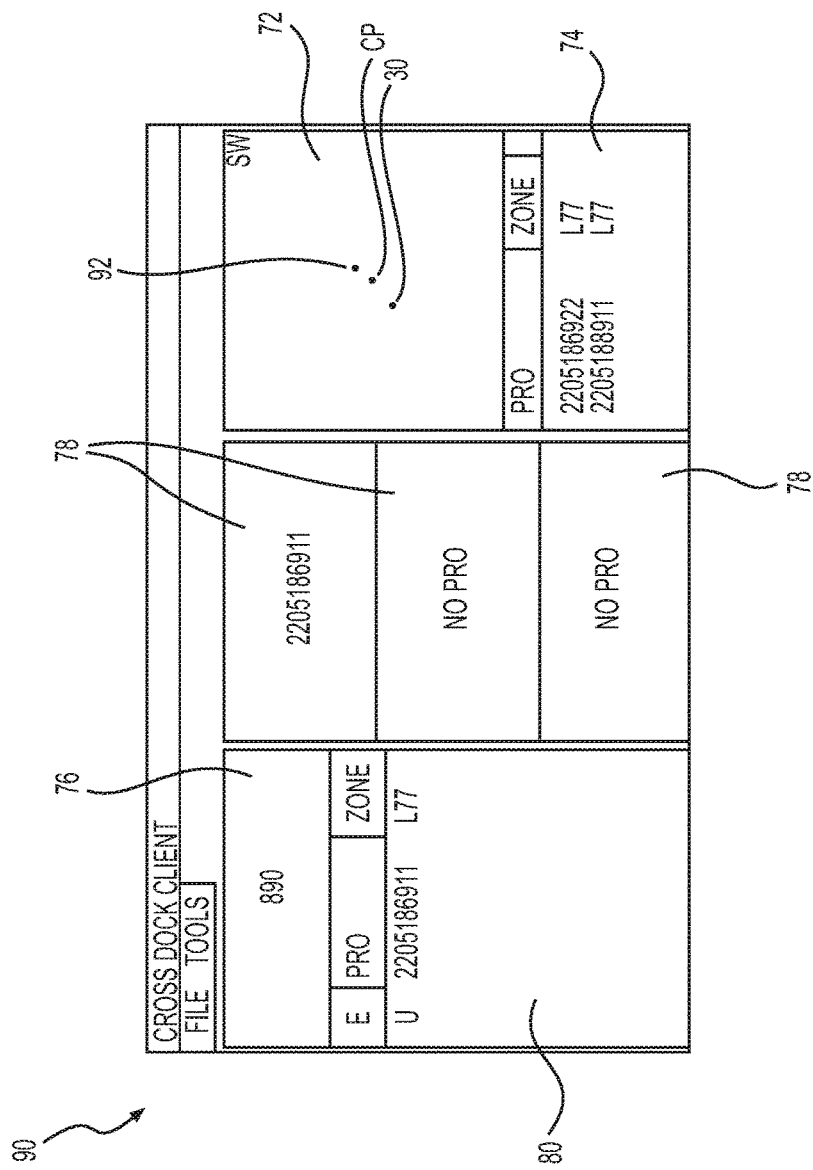
FIG. 6 is an image illustrating a screenshot from a display device after determining that the object of FIG. 5 is loaded onto the vehicle.
Figure 7:
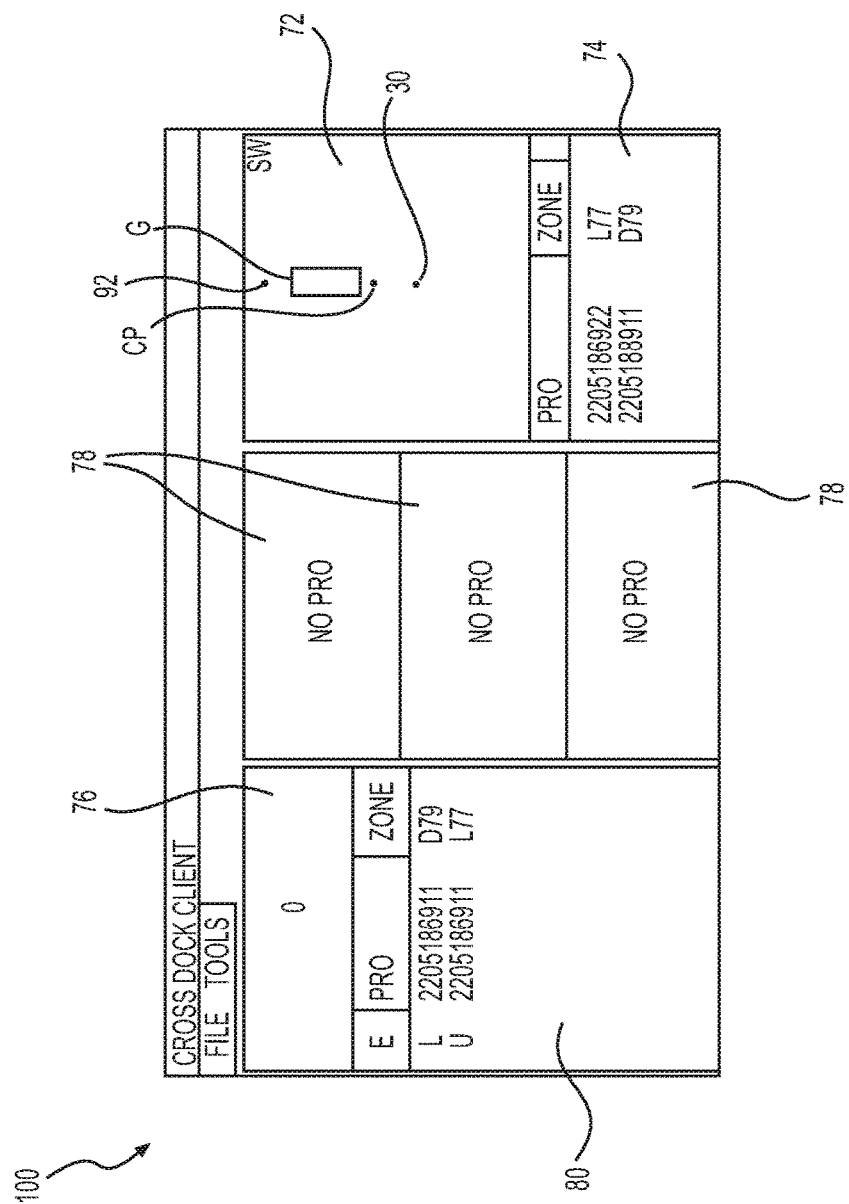
FIG. 7 is an image illustrating a screenshot from a display device after determining that the object of FIG. 5 is unloaded from the vehicle.

Various screenshots of the operator display device 25 during the operation of the forklift 20 are shown in FIGS. 5-7 and described below, according to an embodiment. The control system of the forklift 20 may run software, such as a cross dock client, for displaying information to the operator relating to the loading and unloading of shipments 30 from the forklift 20. The embodiments of the screenshots shown in FIGS. 5-7 and described below are exemplary and not intended to be limiting. Some of the information provided in the screenshots may be omitted or may be shown in a different format (e.g., using a different layout). Other information may be added as desired.

FIG. 5 is an image illustrating a screenshot 70 of the operator display device 25 of one forklift 20, according to an embodiment. As described below, screenshot 70 indicates that no shipments 30 are loaded onto the forklift 20. Screenshot 70 may include a map view box 72, a map information box 74, a weight information box 76, one or more load identification boxes 78, and/or an event information box 80.

The map view box 72 may show at least a portion of the map of the worksite 10 stored on the worksite computer system 40. For example, in the embodiment shown in FIG. 5, the map view box 72 shows only a portion of the map of the worksite 10 surrounding the center point CP of the forklift 20. The map view box 72 may change as the forklift 20 travels through the worksite 10 and as the shipments 30 located near the forklift 20 are moved to other locations. The map view box 72 may also indicate a general direction of travel of the forklift 20 (e.g., based on the direction determining device 24 for the forklift 20 as described above) and the location of the center point CP of the forklift 20 (e.g., based on the locations of the forklift tags 22 as described above). For example, in screenshot 70, "W" shown in the top right corner of the map view box 72 indicates the direction "west," and therefore the forklift 20 is generally traveling west. The map view box 72 may also indicate coordinates of the center point CP in the worksite 10 with respect to a local positioning system.

The map view box 72 may indicate the location of the geofence G for the forklift 20 and other objects along the path of the forklift 20. The map view box 72 may also indicate the locations of the shipments 30 surrounding the forklift 20 within the area represented by the map view box 72 (e.g., based on the locations of the shipment tags 32 as described above). Accordingly, the map view box 72 may identify and locate for the operator the shipments 30 and other objects surrounding the forklift 20.

The map view box 72 may illustrate the location of the forklift 20 and the locations of the shipments 30 using different colored dots, e.g., a black dot for the forklift 20 (e.g., the center point CP), red dots for shipments 30 loaded onto the forklift 20, and blue dots for other shipments 30. For example, in screenshot 70, since no shipments 30 have been loaded onto the forklift 20, the map view box 72 may illustrate the center point CP of the forklift 20 using a black dot, and may illustrate the unloaded shipments surrounding the forklift 20 using blue dots.

Although the map view box 72 may illustrate the locations of other forklifts 20 surrounding the forklift 20, the operator may understand that the forklift 20 being operated is indicated by the black dot in the center of the map view box 72. Thus, each forklift 20 may have an operator display device 25 with a map view box 72 that positions the center point CP of the particular forklift 20 at the center of its map view box 72.

The map information box 74 may indicate information about the shipments 30 identified in the map view box 72. The map information box 74 may indicate the identifier for each shipment 30, and/or a general zone or area where the shipment 30 is located (e.g., the lane, dock, or other area in the worksite 10). The worksite 10 may be divided into general zones represented by one or more alphanumeric characters and/or symbols. For example, in the embodiment shown in FIG. 5, screenshot 70 identifies the three shipments 30 shown in the map view box 72 using their identifiers (e.g., PRO numbers). Also, the shipments 30 are identified as being located in zone "L77" (e.g., lane 77 at the worksite 10).

The weight information box 76 may show the weight of the load on the forklift 20, such as the weight of the pallet 31 and the shipment 30 determined using the weight determining device 23. The weight may be indicated in pounds. The weight information box 76 may be updated continuously using the weight determining device 23 (e.g., every 0.5 or 1 second). In the embodiment shown in FIG. 5, screenshot 70 indicates that there is no weight or load on the forklift 20.

The load identification box(es) 78 may indicate the shipments 30 (if any) that are loaded onto the forklift 20, e.g., using the identifiers for the loaded shipments 30. In the embodiment shown in FIG. 5, screenshot 70 has three load identification boxes 78, which may therefore identify up to three different shipments 30 loaded onto the forklift 20. However, screenshot 70 indicates "NO PRO" (no PRO number) in each of the three load identification boxes 78, thereby indicating that there are no shipments 30 loaded onto the forklift 20. Alternatively, screenshot 70 may include fewer or more than three load identification boxes 78.

The event information box 80 may continuously log the loading and unloading of shipments 30 using the forklift 20 into the zones in the worksite 10, as described below in connection with FIGS. 6 and 7. For example, the event information box 80 may provide information about the event that occurred (e.g., by showing "L" to indicate the loading of the shipment into a zone or by showing "U" to indicate the unloading of the shipment from a zone, by indicating the zone where the load or unload event occurred, and by identifying the shipment that was loaded or unloaded). Thus, the event information box 80 may show a history of load and unload events associated with the forklift 20.

FIG. 6 is an image illustrating another screenshot 90 of the operator display device 25 of the forklift 20 after the forklift 20 loads a shipment 92 and is traveling to a location for unloading the shipment 92, according to an embodiment. Screenshot 90 shown in FIG. 6 may be similar to screenshot 70 shown in FIG. 5, with the differences described below.

In the embodiment of FIG. 6, the worksite computer system 40 may determine that shipment 92 enters the geofence G for the forklift 20 and that the weight determining device 23 measures that the load on the forklift 20 is 890 pounds, as reflected in the weight information box 76. The worksite computer system 40 may determine that 890 pounds is greater than the threshold (e.g., approximately 35 pounds), and therefore may determine that the shipment 92 is loaded onto the forklift 20. The worksite computer system 40 may then communicate information about the load event to the forklift 20 to display to the operator on the operator display device 25 (e.g., in screenshot 90).

The shipment 92 that is loaded onto the forklift 20 may be identified in one of the load identification boxes 78 by its PRO number 2205186911. The other two load identification boxes 78 may indicate "NO PRO" (no PRO number), thereby indicating that there are no other shipments 30 loaded onto the forklift 20.

The event information box 80 may log the loading of the shipment 92 onto the forklift 20 or, in other words, the "unloading" of the shipment 92 from a zone of the worksite 10. Specifically, information may be added to the event information box 80 that may identify where the unload event occurred (zone L77), the letter "U" to indicate the unloading of the shipment 92 from zone L77, and the PRO number (2205186911) for the shipment 30.

Because the shipment 92 is loaded onto the forklift 20, the depiction of the geofence G in map view box 72 may be removed. The loaded shipment 92 may be illustrated using a red dot, and the unloaded shipment 30 indicated in map view box 72 may be illustrated using a blue dot. Also, in the embodiment of FIG. 6, the map information box 74 may identify the shipments 30, 92 as located in zone L77 (e.g., lane 77 at the worksite 10).

FIG. 7 is an image illustrating another screenshot 100 of the operator display device 25 of the forklift 20 after the forklift 20 unloads shipment 92, according to an embodiment. Screenshot 100 shown in FIG. 7 may be similar to screenshot 90 shown in FIG. 6, with the differences described below.

In the embodiment of FIG. 7, the worksite computer system 40 may determine that the weight determining device 23 measures no load on the forklift 20, as reflected in the weight information box 76, and therefore that the shipment 92 is unloaded from the forklift 20. The worksite computer system 40 may then communicate information about the unload event to the forklift 20 to display to the operator on the operator display device 25 (e.g., in screenshot 100).

All of the load identification boxes 78 may indicate "NO PRO" (no PRO number), thereby indicating that there are no shipments 30 loaded onto the forklift 20. Because there are no shipments 30 loaded onto the forklift 20, the geofence G is shown again in the map view box 72. The unloaded shipment 92 may be illustrated with the other unloaded shipment 30 using blue dots.

The event information box 80 may log the unloading of the shipment 92 from the forklift 20 or, in other words, the "loading" of the shipment 92 into a zone of the worksite 10. Specifically, information may be added to the event information box 80 that may identify where the load event occurred (zone D79, e.g., dock 79 at the worksite 10), the letter "L" to indicate the loading of the shipment 92 into zone D79, and the PRO number (2205186911) for the shipment 92.

Also, in the embodiment of FIG. 7, the map information box 74 may list the shipments 30, 92 shown in map view box 72, and may identify one of the shipments as located in zone L77 and one of the shipments (e.g., shipment 92) as located in zone D79.

Although the forklifts 20 and shipments 30 may be moved throughout the worksite 10, the tracking system 50 may provide information regarding the loading and unloading of the shipments 30 more accurately and efficiently. The tracking system 50 may identify when shipments 30 are loaded onto forklifts 20 without relying on the forklift operator to exit the forklifts 20 to enter or scan information each time shipments 30 are loaded and unloaded. Instead, the tracking system 50 may automatically determine whether the shipment 30 is loaded onto the forklift 20, and forklift operators may remain seated in the forklifts 20. As a result, time and labor costs may be reduced.

The tracking system 50 may track the shipments 30 directly using the shipment tags 32 rather than relying on forklift operator input. As a result, the tracking system 50 may provide tracking information that is more reliable and accurate. This may reduce the risk of operator error from entering the wrong information or from misplacing any documents that the operator may use to enter information about the shipments 30, which may reduce the number of shipments 30 that are lost or delayed.

Further, the readers 52 may experience jitter or other error in reading the forklift and shipment tags 22, 32. By verifying that the weight of the load on the forklift 20 is above a threshold before determining that the shipment 30 is loaded onto the forklift 20, the tracking system 50 may avoid falsely indicating that the shipment 30 is loaded when the shipment 30 may actually be positioned next to the forklift 20 and not loaded.

Monitoring the weight of the load carried by the forklift 20 may also alert the worksite computer system 40 that a shipment 30 has been loaded onto the forklift 20 even though the worksite computer system 40 has not determined that the shipment 30 entered the geofence G, e.g., due to jitter or other error. Also, the worksite computer system 40 may dynamically adjust the size of the geofence G when a load is detected on the forklift 20, but no shipment 30 has entered the geofence G. Thus, the worksite computer system 40 may automatically detect the loading of shipments 30 of non-standard size.

Although the embodiments described above relate to tracking forklifts 20, it is to be understood that the tracking system 50 may also perform similar steps to track other vehicles or machines and the loads that those vehicles or machines may carry. The worksite computer system 40 may then create geofences G that correspond to the size and location of a load carried by the vehicle or machine as known in the art.

It will be apparent to those skilled in the art that various modifications and variations can be made to the methods and systems described above. Other embodiments will be apparent to those skilled in the art from consideration of the specification and practice of the disclosed methods and systems. It is intended that the specification and examples be considered as exemplary only, with a true scope being indicated by the following claims and their equivalents.

What is claimed is:

1. A system for tracking objects, comprising:
   a computer system configured to:
   receive data from a reader via a communication network, the data including information from a device associated with an object;
   determine a location of the object based on the data received from the reader;
   determine a location of an object transport vehicle based on data received from a device associated with the object transport vehicle;
   generate a geofence surrounding the determined location of the object transport vehicle, a size of the geofence being based on a loading area of the object transport vehicle; and
   determine whether the object is within the geofence based on the determined location of the object and at least one parameter of the geofence to determine whether the object has been loaded on the object transport vehicle.

2. The system of claim 1, wherein the device associated with the object includes a tag, and the reader is configured to read the tag to obtain the data and transmit the data to the computer system, wherein the data includes identification information of the tag associated with the object.

3. The system of claim 1, wherein the device associated with the object transport vehicle is a tag, and wherein the reader is configured to read the tag to obtain identification information of the tag associated with the object transport vehicle.

4. The system of claim 3, wherein the reader is also configured to transmit information indicating at least one of a strength or an angle of a signal received from the tag to the computer system.

5. The system of claim 4, wherein the computer system is configured to determine the location of the tag based on at least one of the identification information of the tag, the strength, or the angle of the signal received from the tag.

6. The system of claim 5, wherein the computer system is configured to determine the location of the object transport vehicle based on the location of the tag.

7. The system of claim 1, wherein the device includes at least one global positioning system device associated with the object and configured to provide location information of the object.

8. The system of claim 7, further including a global positioning system device associated with the object transport vehicle and configured to provide location information of the object transport vehicle.

9. The system of claim 8, wherein the computer system is configured to store a map including information indicating locations of the object transport vehicle, the geofence, and the object.

10. The system of claim 9, wherein the computer system is configured to periodically update the map with updated locations of the object transport vehicle, the geofence, and the object at every predetermined time period.

11. The system of claim 1, further including a plurality of tags associated with the object transport vehicle, and wherein the computer system is configured to:
   receive signals from the plurality of tags;
   determine locations of the plurality of tags based on the received signals; and
   determine the location of the object transport vehicle based on the locations of the plurality of tags.

12. The system of claim 11, wherein the computer system is configured to:
   identify a center point of the object transport vehicle based on the locations of the plurality of tags; and
   generate the geofence based on the center point of the object transport vehicle and a predetermined distance.

13. The system of claim 1, wherein the at least one parameter of the geofence includes at least one of a location and a size of the geofence.

14. The system of claim 1, wherein the computer system is configured to monitor a location of at least one of the geofence, the object transport vehicle, or the object.

15. The system of claim 1, wherein the computer system is configured to monitor a weight of a load transported by the object transport vehicle.

16. The system of claim 15, wherein the computer system is configured to determine whether the weight of the load transported by the object transport vehicle is greater than a threshold.

17. The system of claim 16, wherein the computer system is configured to adjust a size of the geofence when the computer system determines that the weight of the load transported by the object transport vehicle is greater than the threshold and that the object is not within the geofence.

18. The system of claim 15, wherein the computer system is configured to determine whether the object has been loaded onto the object transport vehicle based on the monitored weight of the load and the determination of whether the object is within the geofence.

19. A method for tracking an object configured to be transported by an object transport vehicle, the method comprising:

receiving, using a computer system, data from a reader via a communication network, the data including information obtained from a device associated with the object;

determining, using the computer system, a location of the object based on the data received from the reader;

determining a location of the object transport vehicle based on data received from a device associated with the object transport vehicle;

generating a geofence surrounding the determined location of the object transport vehicle, a size of the geofence being based on a loading area of the object transport vehicle; and determining whether the object is within the geofence based on the determined location of the object and at least one parameter of the geofence to determine whether the object has been loaded on the object transport vehicle.

20. A non-transitory computer-readable medium containing instructions that, when executed by a computer, cause the computer to perform a method for tracking objects, the method comprising:

receiving, using a computer system, data from a reader via a communication network, the data including information obtained from a device associated with the object;

determining, using the computer system, a location of the object based on the data received from the reader;

determining a location of an object transport vehicle based on data received from a device associated with the object transport vehicle;

generating a geofence surrounding the determined location of the object transport vehicle, a size of the geofence being based on a loading area of the object transport vehicle; and determining whether the object is within the geofence based on the determined location of the object and at least one parameter of the geofence to determine whether the object has been loaded on the object transport vehicle.

* * * * *